Oct. 30, 1962 J. W. DE RUITER 3,061,768
HIGH-FREQUENCY FURNACE
Filed Nov. 16, 1959

INVENTOR
J. W. DE RUITER
BY
AGENT

United States Patent Office 3,061,768
Patented Oct. 30, 1962

3,061,768
HIGH-FREQUENCY FURNACE
Jacob Willem de Ruiter, Eindhoven, Netherlands, assignor to North American Philips Company, Inc., New York, N.Y., a corporation of Delaware
Filed Nov. 16, 1959, Ser. No. 853,082
Claims priority, application Netherlands Dec. 3, 1958
4 Claims. (Cl. 321—16)

This invention relates to a high-frequency furnace provided with a grid-controlled thermionic valve provided with feedback and with a rectifier arrangement for the direct-current supply of the thermionic valve. More particularly, the invention relates to an arrangement comprising a supply transformer supplied from an alternating voltage means, each of the ends of a secondary winding of this transformer is connected, through a rectifier, to a first direct-current supply lead, while the second direct-current supply lead is connected by a connecting lead to a star point of the secondary of the supply transformer. The rectifier arrangement can be designed to rectify a single-phase or a three-phase supply alternating voltage.

In such high frequency furnaces it is necessary to regulate the output power in order to control the high-frequency heating of workpieces of different nature and size or to vary the heating in a predetermined manner. For example, in hardening high-grade alloy steels, in gettering thermionic valves and the like, gradual heating must be combined with short-time quick heating for a few seconds or even tenth parts of seconds.

It is an object of the present invention to provide an arrangement of the kind described in the preamble, which in practice distinguishes itself by its simplicity and favourable properties.

The arrangement in accordance with the invention is characterized in that there is connected, between the second direct-current supply lead and each of the ends of the secondary winding of the supply transformer, a controllable rectifier, all the controllable rectifiers being connected to a control voltage generator which controls the conductive or cut-off conditions of these rectifiers, while the lead connecting the neutral point of the secondary of the supply transformer to the second direct-current supply lead includes a rectifier which is connected to said second direct-current supply lead in the same current pass direction as the controllable rectifiers connected to this direct-current supply lead.

In order that the invention may readily be carried out, it will now be described in detail with reference to the accompanying diagrammatic drawings, in which:

FIG. 1 shows a high-frequency furnace for induction heating in accordance with the invention, which furnace may have a rated power of, say, 6 kw.

Figure 1:
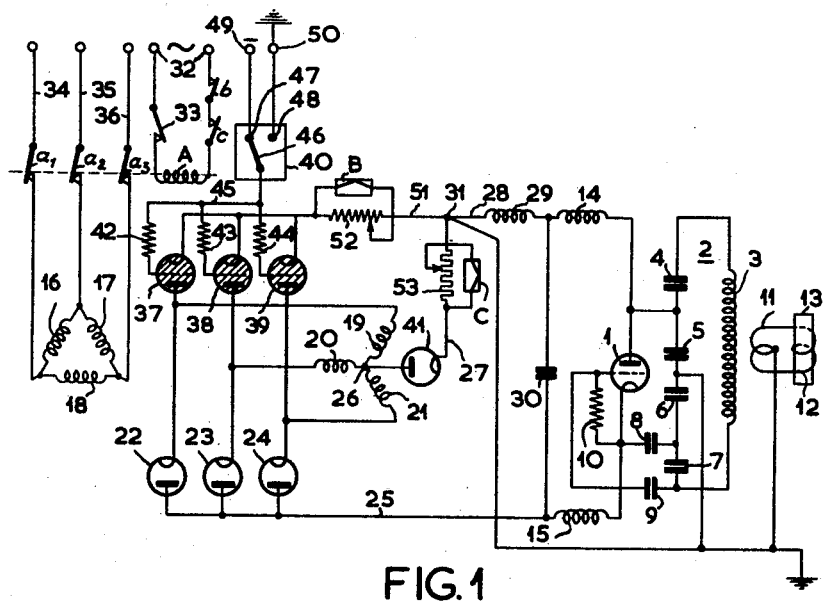
FIG. 1 shows a high-frequency furnace in accordance with the invention.

In this furnace, the high-frequency energy required for heating is taken from a thermionic valve oscillator comprising a triode 1. The tuned anode circuit of the oscillator, which is designed as a Colpitts circuit, is provided with a resonant circuit 2 which determines the oscillator frequency and comprises a circuit coil 3 and a circuit capacitance constituted by four series-connected capacitors 4, 5, 6, 7, the anode of the tube 1 being connected to the junction of the capacitors 4, 5, while the feedback voltage is taken from the capacitor 7 one end of which is connected, through a capacitor 8, to the cathode of the valve 1, while the other end is connected, through a capacitor 9, to the control grid to a grid resistor 10.

The high-frequency energy produced by the operation of the oscillator is supplied, through a coupling coil 11 having an earthed centre tap, to a work coil 12 in which a workpiece 13 to be heated is arranged.

In the arrangement described, the direct current for the triode 1 is supplied to the anode and the cathode of this triode 1 through high-frequency choke coils 14 and 15 connected in the direct-current supply circuit, while the junction of the capacitors 5 and 6, which is also the centre tap of the capacitive voltage divider 4, 5, 6, 7, is connected to earth, so that the ends of the circuit coil 3 carry one half of the circuit voltage with respect to earth. Hence, without difficulty with respect to insulation the spacing between the coil 3 and the coupling coil 11 can be reduced, with a resulting considerable reduction in the leakage losses in the output transformer comprising the circuit coil 3 and the coupling coil 11. For high-frequency heating of workpieces of different nature and size, the transformation ratio of the transformer 3, 11, is adjustable, for example, in the manner described in a co-pending application (cf. U.S. patent specification 2,662,162).

The supply direct voltage for the triode 1 is taken from a rectifier arrangement which is supplied with a three-phase alternating voltage of, for example, 3 x 380 volts. The rectifier arrangement is provided with a supply transformer having primary windings 16, 17, 18 in delta connection and secondary windings 19, 20, 21 in star connection, the end of each of the secondary windings 19, 20, 21 being connected through a diode 22, 23 or 24 respectively to a first direct-current supply lead 25, the star point 26 being connected, through a connecting lead 27, to a second direct-current supply lead 28, which includes a smoothing filter comprising a series choke coil 29 and a parallel capacitor 30. A junction 31 of the connecting lead 27 of the second direct-current supply lead 28 is connected to earth.

For the operation of the rectifier arrangement, there is connected to terminals 32 of a single-phase alternating voltage source of, for example, 220 volts, a control circuit comprising the series connection of a control switch 33 and the energizing winding of a relay A of which the relay contacts $a_1$, $a_2$, $a_3$ are connected in leads 34, 35, 36 connecting the alternating voltage supply source to the primary windings 16, 17, 18 of the supply transformer. When the control switch 33 is closed, the relay A is energized and the supply alternating voltage is supplied to the rectifier arrangement, while conversely, if the control switch 33 is opened, the supply circuit of the rectifier arrangement is broken.

In order to adapt the high-frequency furnace described so far, which is suitable for high-frequency heating of workpieces of different nature and size, in a simple manner to a very rapid heating process, such as may be required for hardening steel, according to the invention there is connected, between the second direct-current supply lead 28 and each of the ends of the secondary windings 29, 30, 31, a controllable rectifier 37, 38, 39, respectively, each controllable rectifier 37, 38, 39 being connected to a control voltage generator 40 which controls the conductive or cut-off conditions of the controllable rectifiers 37, 38, 39, while there is connected in the connecting lead 27 to the second direct-current supply lead 28 a diode 41, which is connected to this direct-current supply lead 28 in the same current pass direction as the controllable rectifiers 37, 38, 39 connected to this direct-current supply lead.

In the embodiment described, the controllable rectifiers 37, 38, 39 are gas discharge tubes having a control electrode, i.e., thyratrons. The control electrodes are connected through resistors 42, 43, 44 to a common control voltage lead 45 which is connected to the control voltage generator 40, while this control-voltage generator is provided with a switch 46 having two switch contacts 47 and 48, the switch contact 47 being connected to the negative terminal 49 of a bias voltage supply, while the switch contact 48 is connected to an earthed terminal 50.

The operation of the arrangement described will now be explained in detail, starting from the condition in which the switch 46 of the control voltage generator 40 is connected to the negative terminal of the bias voltage supply. In this condition, the thyratrons 37, 38, 39 are cut off by the bias voltage supply 49 and the rectifier circuit which is operative in this condition between the direct current supply leads 25 and 28, comprises the secondary windings 19, 20, 21 of the supply transformer, the diodes 22, 23, 24 and the lead 27 between the star point 26 of the secondary windings 19, 20, 21 and the second direct-current supply lead 28, which lead 27 includes the diode 41 which, in the current pass direction shown, forms a conductive connection for the supply direct current produced. By rectification in the diodes 22, 23, 24, there is set up across the output capacitor 30 of the smoothing filter a direct supply voltage of, say, 4500 volts, which is supplied to the high-frequency furnace 1 as the supply voltage.

If, starting from this condition, the switch 46 of the control voltage generator 40 is connected to earth through the switch contact 48, the thyratrons 37, 38, 39 are rendered conductive and the voltage of the output capacitor 30 starts to increase, so that the potential at the star point 26 of the transformer is forced to shift in the negative sense with respect to earth, with the result that the diode 41 in the lead 27 connecting the star point 26 to the second direct-current supply lead 28 is cut off. Thus, in the rectifier circuit not only the diodes 22, 23, 24 but also the thyratrons 37, 38, 39 are operative and there is set up across the output capacitor 30 of the smoothing filter 29, 30 a direct supply voltage of about 9000 volts, that is to say, twice that of the preceding case. Thus, the output power of the high-frequency furnace can be increased by a factor four and this increase of the power output causes a very rapid heating of the workpiece 13 in the workcoil 11.

If, now, the switch 46 of the control voltage generator 40 is switched back to the switch contact 47, the thyratrons 37, 38, 39 are cut off by the negative bias voltage from the supply source 49. Hence, the voltage across the output capacitor 30 of the smoothing filter 29, 30 decreases while at the instant at which the star point 26 of the secondary windings 19, 20, 21 assumes earth potential, the diode 41 connected in the lead 27 connecting the star point 26 to the second direct current supply lead 28 is rendered conductive, so that the operative rectifier circuit again comprises the diodes 22, 23, 24 and the secondary windings 19, 20, 21 together with the conductive connection 27 between the star point 26 and the second direct-current supply lead 28. As has been described before, the diode 41 acts as a switch which, on operation of the switch 46 of the control voltage generator 40, is cut off and rendered conductive at exactly the right instants, so that transient currents, which can assume very high values in switching processes at a high power level, are completely avoided.

The arrangement described distinguishes itself by a smooth control while furthermore the simplicity of its construction and operation render it highly suitable for use in practice.

A further important feature consists in that in the two operational conditions of the arrangement described, that is to say, the condition in which the diodes 22, 23, 24 are operative together with the thyratrons 37, 38, 39 and the condition in which the diodes 22, 23, 24 only are operative, the supply direct current can be controlled independently and simply, for in the first case the lead 27 connecting the star point 26 of the secondary windings 19, 20, 21 to the junction 31 with the second direct-current supply lead 28 carries no current owing to the diode 41 being cut off, while in the second case the lead 51 connecting the junction 31 to the thyratrons 37, 38, 39 carries no current owing to these thyratrons 37, 38, 39 being cut off. In order to control the maximum permissible supply direct current in these two cases, there are connected to the lead 27 and 51 maximum relay B and C respectively, which have rest contacts $b$ and $c$ in the control circuit of the rectifier arrangement, the energizing windings of the relay B and C shunting series resistors 52 and 53 respectively, which are variable in order to enable the response values of the relay B and C to be adjusted. If, for example, the supply direct current in one of the above-mentioned cases exceeds its maximum permissible value, the relay B or the relay C is energized so that the control relay A releases and the supply alternating voltage for the primary windings 16, 17, 18 of the supply transformer is switched out of circuit.

It should be noted that the insulation and hence the spacing between the circuit coil 3 and the coupling coil 11 must be rated for the maximum alternating voltage occurring in the circuit, that is to say, in the embodiment described, the circuit alternating voltage associated with the supply direct voltage of 9,000 volts. When using the measure in accordance with the invention, the high-frequency furnace of the type shown in FIG. 1, in which a centre tap on the output circuit 2 is earthed, is particularly suitable, since, as has been set forth hereinbefore, the leakage losses in the transformer 3, 11 are materially reduced.

Figure 2:
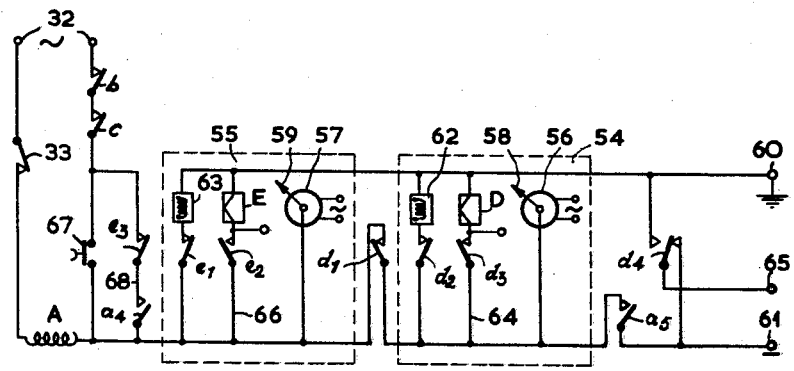
FIG. 2 shows a control voltage generator for use in the high-frequency furnace of FIG. 1.

FIG. 2 shows a control voltage generator which was extensively tested in practice and can be used to advantage for the hardening of steel in the arrangement shown in FIG. 1. The figure also shows the control circuit of the rectifier arrangement, elements corresponding to those of the FIG. 1 being designated by like reference numerals.

The control voltage generator is provided with two timing devices 54 and 55, which each comprise an electric motor 56 and 57, respectively, a setting pointer 58 and 59, respectively, a switching relay D and E, respectively, connected between earth 60 and a negative terminal 61 of a supply voltage source, and a coupling magnet 62 and 63, respectively, the maximum adjusting period of the timing device 54 being, say, 100 seconds and the maximum adjusting period of the device 55 being one second. The switching relay D is provided with a work contact $d_1$ connected in the supply circuit of the second timing device 55, a rest contact $d_2$ in the supply circuit of the coupling magnet 62, a work contact $d_3$ in a holding circuit 64 of the relay D, and with a changeover contact $d_4$ by means of which a terminal 65, which is connected to the control voltage lead 45 (cf. FIG. 1), can be connected either to earth 60 or to the negative terminal 61 of the supply voltage source. The switching relay E has a rest contact $e_1$ connected in the supply circuit of the coupling magnet 63, a work contact $e_2$ in a holding circuit 66 of the relay E and a rest contact $e_3$ in the control circuit of the high-frequency furnace.

In order to operate the control voltage generator, the control circuit of the high-frequency furnace includes a push-button switch 67 which is bridged by a holding circuit 68 of the control relay A, which holding circuit includes the rest contact $e_3$ of the relay E of the timing device 55. For the operation of the control voltage generator, the control relay A is also provided with two additional work contacts, viz. a work contact $a_4$ included in the holding circuit 68 of the operating relay A and a work contact $a_5$ which couples the supply voltage of the terminals 60, 61 to the control voltage generator.

If a work piece 13 must be hardened in the work coil 12, for the gradual heating of the work piece 13, which promotes the formation of carbides, the timing device 54 is set by means of the setting pointer 58 to a desired value, for example, to 10 seconds, while for a rapid heating for hardening the work piece 13 the setting pointer 59 of the timing device 55 is set to, say, 0.8 second.

If, now, the push-button switch 67 is pushed, the control relay A is energized, the supply alternating voltage circuit is completed, as is the holding circuit 68 of the relay A through the contact $a_4$, so that, when the push-button 67 is released, the operation relay A remains energized through the holding circuit 68, while the control voltage generator is connected to the supply voltage source 60, 61 through the work contact $a_5$. In this condition, the thyratrons 37, 38, 39 are cut off and the work piece 13 is gradually heated, the coupling magnet is energized and couples the setting pointer 58 to the shaft of the electromotor 56. On termination of the set time of the timing device 54, the relay D is energized through the setting pointer 58 and held in the energized condition by its holding circuit 64, the supply circuit for the coupling magnet 62 is broken, the supply circuit for the second timing device 55 is closed and the control voltage lead of the thyratrons 37, 38, 39 is connected to earth.

Thus, as has been described hereinbefore, the thyratrons 37, 38, 39 are ignited and, since the power output of the high-frequency furnace is increased to four times the initial value, the work-piece 13 is rapidly heated for a period of time determined by the set time of the second timing device 55. This is due to the fact that, when the supply circuit for the second timing device 55 is completed the coupling magnet is energized so that the setting pointer 59 is coupled to the shaft of the electromotor 57 and hence, after the set time of the timing device 55, the relay E is energized and remains energized through its holding circuit 66, while the holding circuit 68 of the operating relay A and the supply circuit of the coupling magnet 63 are broken.

The control relay A releases so that the supply alternating voltage circuit of the rectifier arrangement and the supply circuit 60, 61 for the control voltage generator are interrupted. Thus, the arrangement has returned to its initial condition, after which the described cycle can be repeated.

It has been found that for a short-time increase of the power output to four times its initial value in order to enable the workpiece 13 to be rapidly heated, the high-frequency furnace can be overloaded without impairing its reliability. In the high frequency furnace described which, as has been stated hereinbefore, is rated for a power of 6 k.w., the output power may be increased to 24 k.w. for a short period of time provided that this period of overloading does not exceed a certain limit value and that it is ensured that the ratio between the overloading period and the normal heating period does not exceed a certain limit value, for example is at most 20%. These two conditions can be simply satisfied by choosing the maximum adjusting time of the timing device 55 to be less than the limit value associated with the overloading period and by also ensuring that the minimum adjusting time of the timing device 54 cannot fall below a certain minimum period of, for example, 5 seconds.

Without detriment to the reliability, in the embodiment described the overloading period can be of the order of a few seconds and thus the high-frequency furnace described can deliver four times its rated power for a short period of time, and this would otherwise require a high-frequency furnace of a power which is four times higher, the purchase and maintenance costs of which would be many times those of the high-frequency furnace according to the present invention. In this short period of at most a few seconds, changing over is effected smoothly without the occurrence of disturbing side effects such as sparking or transient currents.

In practice, a rapid heating for a few seconds is amply sufficient so that the range of application of high-frequency furnaces is materially extended by the steps according to the invention.

For a practical embodiment of a high-frequency furnace of the kind shown in FIGURE 1, which is rated for a power of 6 k.w., the following are particulars of the valves used.

Triode 1: Philips 2 x TBW 7/8000. Thyratrons 37, 38, 39: 3 x DCG 6/6000.

Diodes 22, 23, 24: Philips 3 x DCG 5/5000. Diode 41: 1 x DCG 6/18.

It should be remarked here that the method described can also be used to advantage in high-frequency furnaces for dielectric heating, for example for heating plastics and the like. It should further be mentioned that the rectifier arrangement can also be used for the rectification of a single-phase alternating voltage, in which event the neutral point at the secondary side of the supply transformer is a centre tap on the secondary winding of the supply transformer.

What is claimed is:

1. A dual voltage rectifier system comprising input means for an alternating current source comprising first and second transformer winding sections connected in series at a tapping point and output means for supplying a direct current comprising first and second terminal leads, first and second rectifier means poled in the same sense each connecting one end of said winding sections to one of said terminal leads, third and fourth rectifier means poled in the same sense each connecting one end of said winding sections and the other of said terminal leads, said third and fourth rectifier means comprising means for controlling the conduction thereof, a unidirectional electrically conducting element interconnecting said tapping point and the said other of said terminal leads, said unidirectional electrically conducting element being poled in a sense to provide series conduction with said first rectifier means, and means for applying a control quantity to said third and fourth rectifier means thereby selectively to control the conduction thereof.

2. A dual voltage rectifier system comprising input mans for an alternating current source comprising first and second transformer winding sections connected in series at a tapping point and output means for supplying a direct current comprising first and second terminal leads, first and second rectifier means poled in the same sense each connecting one end of said winding sections to one of said terminal leads, third and fourth rectifier means poled in the same sense each connecting one end of said winding sections and the other of said terminal leads, said third and fourth rectifier means comprising gaseous discharge tubes having a control electrode for controlling the conduction thereof, a unidirectional electrical electrically conducting element interconnecting said tapping point and the said other of said terminal leads, said unidirectional electrically conducting element being poled in a sense to provide series conduction with said first rectifier means, and a control voltage generator for applying a control quantity to said third and fourth rectifier means thereby selectively to control the conduction thereof, said control voltage generator comprising means for selectively applying to said control electrodes a first potential having a value producing current cut-off in said third and fourth rectifier means and a second potential having a value producing current conduction in said last-mentioned rectifier means.

3. A dual voltage rectifier system comprising input means for an alternating current source comprising first and second transformer winding sections connected in series at a tapping point and output means for supplying a direct current comprising first and second terminal leads, first and second rectifier means poled in the same sense each connecting one end of said winding sections to one of said terminal leads, third and fourth rectifier means poled in the same sense each connecting one end of said winding sections and the other of said terminal leads, said third and fourth rectifier means comprising means for controlling the conduction thereof, a unidirectional electrically conducting element interconnecting said tapping point and the said other of said terminal leads, said unidirectional electrically conducting element being poled in a sense to provide series conduction with said first rectifier means, and a control voltage generator for applying a control quantity to said third and fourth rectifier means thereby selectively to control the conduction thereof, said control voltage generator comprising first and second adjustable timing devices, switch means for operating said timing devices in sequence and means actuated by said timing devices for selectively applying to said control electrodes a first potential having a value producing current cut-off in said third and fourth rectifier means and a second potential having a value producing current conduction in said last-mentioned rectifier means.

4. A dual voltage rectifier system comprising input means for an alternating current source comprising first and second transformer winding sections connected in series at a tapping point and output means for supplying a direct current comprising first and second terminal leads, first and second rectifier means poled in the same sense each connecting one end of said winding sections to one of said terminal leads, third and fourth rectifier means poled in the same sense each connecting one end of said winding sections and the other of said terminal leads, said third and fourth rectifier means comprising means for controlling the conduction thereof, a unidirectional electrically conducting element interconnecting said tapping point and the said other of said terminal leads, said unidirectional electrically conducting element being poled in a sense to provide series conduction with said first rectifier means, and means for applying a control quantity to said third and fourth rectifier means thereby selectively to control the conduction thereof, first means responsive to current values greater than a given value interposed between the said controlled rectifier means and the terminal lead connected thereto for deenergizing said input means, and second means responsive to current value greater than a given value connected in series relationship with said unidirectionally conducting element for deenergizing said input means.

References Cited in the file of this patent
UNITED STATES PATENTS

| | | |
|---|---|---|
| 1,874,840 | Williamson | Aug. 30, 1932 |
| 2,239,437 | Bedford | Apr. 22, 1941 |
| 2,545,298 | Mittelmann | Mar. 13, 1951 |
| 2,720,622 | Deuser | Oct. 11, 1955 |
| 2,785,370 | Levy | Mar. 12, 1957 |
| 2,809,293 | Rambo et al. | Oct. 8, 1957 |